(12) United States Patent
Hattori et al.

(10) Patent No.: US 11,056,957 B2
(45) Date of Patent: Jul. 6, 2021

(54) ROTARY ELECTRIC MACHINE EQUIPPED WITH MAGNETIC FLUX VARIABLE MECHANISM

(71) Applicant: TOYOTA JIDOSHA KABUSHIKI KAISHA, Toyota (JP)

(72) Inventors: Hiroyuki Hattori, Okazaki (JP); Tatsuhiko Mizutani, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 357 days.

(21) Appl. No.: 16/193,456

(22) Filed: Nov. 16, 2018

(65) Prior Publication Data

US 2019/0165659 A1    May 30, 2019

(30) Foreign Application Priority Data

Nov. 27, 2017   (JP) .............................. JP2017-227124

(51) Int. Cl.
| | |
|---|---|
| *H02K 21/02* | (2006.01) |
| *H02K 21/14* | (2006.01) |
| *H02K 7/06* | (2006.01) |
| *H02K 1/27* | (2006.01) |

(52) U.S. Cl.
CPC ........... *H02K 21/028* (2013.01); *H02K 1/276* (2013.01); *H02K 7/06* (2013.01); *H02K 21/14* (2013.01); *H02K 2213/09* (2013.01)

(58) Field of Classification Search
CPC ...... H02K 21/028; H02K 1/276; H02K 21/14; H02K 7/06; H02K 2213/09; H02K 1/02; H02K 1/2706

USPC ......................................................... 310/80
See application file for complete search history.

(56) References Cited

U.S. PATENT DOCUMENTS

| | | | |
|---|---|---|---|
| 2012/0074913 A1 | 3/2012 | Finkle | |
| 2012/0200186 A1* | 8/2012 | Sano | H02K 1/2766 310/156.01 |

FOREIGN PATENT DOCUMENTS

| | | |
|---|---|---|
| JP | H11-122886 A | 4/1999 |
| JP | H11-275789 A | 10/1999 |
| JP | H11-308792 A | 11/1999 |
| JP | 2001-275326 A | 10/2001 |
| JP | 2002-136012 A | 5/2002 |
| JP | 2002136012 * | 5/2002 |
| JP | 2007221881 * | 8/2007 |
| JP | 2013-046430 A | 3/2013 |

(Continued)

*Primary Examiner* — Ahmed Elnakib
(74) *Attorney, Agent, or Firm* — Oliff PLC (57) ABSTRACT

A rotary electric machine equipped with a magnetic flux variable mechanism includes a case body, a mover moving upon receipt of centrifugal force, a magnetic flux short circuit member, a cam member, and biasing springs. The cam member includes a cam surface so as to face the mover and make contact with the mover, and the cam member converts a radial movement of the mover received by the cam surface into an axial movement of the magnetic flux short circuit member. The biasing springs give a biasing force to the magnetic flux short circuit member in a direction distanced from an axial end surface of the rotor core, so as to determine a position of the magnetic flux short circuit member along the axial direction in a state where the biasing force is balanced with the centrifugal force applied to the mover via the cam member.

9 Claims, 6 Drawing Sheets

(56) References Cited

FOREIGN PATENT DOCUMENTS

JP    2013046430    *  3/2013

* cited by examiner

ROTARY ELECTRIC MACHINE EQUIPPED WITH MAGNETIC FLUX VARIABLE MECHANISM

CROSS-REFERENCE TO RELATED APPLICATIONS

This application claims priority to Japanese Patent Application No. 2017-227124 filed on Nov. 27, 2017, which is incorporated herein by reference in its entirety.

BACKGROUND

1. Technical Field

This disclosure relates to a rotary electric machine equipped with a magnetic flux variable mechanism.

2. Description of Related Art

As a rotary electric machine used for an electrically-driven vehicle, a rotary electric machine of an interior permanent magnet (IPM) type configured such that a plurality of permanent magnets is embedded along the circumferential direction of a rotor core so as to form magnetic poles is used to achieve reduction in size and weight and to improve power efficiency. In the rotary electric machine of the interior permanent magnet type, a magnetic flux generated from the permanent magnets of the rotor is uniform generally. Accordingly, as the rotation speed of the rotor increases, an induced voltage generated in a stator coil increases, and when the induced voltage exceeds a drive voltage, the rotary electric machine may become uncontrollable. As a method to avoid this situation, a weak field control like a circuit is used, or a magnetic flux variable mechanism configured to change the magnetic flux directed from the permanent magnets of the rotor toward a stator and interlinked with the stator coil according to the rotation speed of the rotor is used.

Japanese Unexamined Patent Application Publication No. 11-275789 (JP 11-275789 A) describes a rotor having permanent magnets embedded in four magnet insertion holes provided so as to surround a rotation shaft, the rotor being configured such that a magnetic short-circuit iron piece movable in the radial direction by a centrifugal force is provided in a slit portion extending from an end of the magnet insertion hole to the vicinity of an outer peripheral end surface of the rotor.

Herein, the magnet insertion hole is connected to the slit portion via a hollow portion as a nonmagnetic material, and the magnetic short-circuit iron piece is biased by a spring to a nonmagnetic part on the inner peripheral side inside the slit portion. A part surrounded by the magnet insertion hole, the slit portion, and an outer peripheral end surface of the rotor is referred to as a pole piece portion. When the rotor rotates at a low rotation speed, the magnetic short-circuit iron piece stays in the nonmagnetic part on the inner peripheral side inside the slit portion. No leakage flux via the magnetic short-circuit iron piece is generated between adjacent pole piece portions. When the rotor rotates at a high rotation speed, the magnetic short-circuit iron piece is moved by a centrifugal force toward an outer peripheral side from the nonmagnetic part against a biasing force of the spring, so that a leakage flux is generated between adjacent pole piece portions and an effective magnetic flux emitted from the rotor is reduced. Thus, the magnetic flux is changed.

Japanese Unexamined Patent Application Publication No. 2001-275326 (JP 2001-275326 A) points out that, in the configuration of JP 11-275789 A, a position control of the magnetic short-circuit iron piece depends on a dynamic balance between a centrifugal force of the rotor and an elastic force of the spring, so that the magnetic poles have different magnetic flux variable effects, and therefore, a stable magnetic flux variable effect cannot be expected. Further, JP 2001-275326 A points out that a mechanism configured to operate the magnetic short-circuit iron piece is provided, in the rotor core, as a magnetic flux variable mechanism, so that the rotor core has a complicated structure, thereby causing a problem of durability of a product. In view of this, the following magnetic flux variable mechanism is disclosed. That is, the magnetic flux variable mechanism is configured such that a magnetic flux short circuit member configured to approach or distance itself from a permanent magnet of a rotor is provided not on a rotor side, but on a stator side, and the magnetic flux short circuit member is driven by an actuator that operates by a motor, a hydraulic pressure, an air pressure, or the like.

SUMMARY

A configuration to change a distance between the rotor and the magnetic flux short circuit member by the actuator, as the magnetic flux variable mechanism for a rotary electric machine, requires a motor, a hydraulic fixture, a pneumatic device, and the like, and also requires a control device for them. Accordingly, a cost is high and a whole rotary electric machine is upsized. If the distance between the rotor and the magnetic flux short circuit member is variable by a centrifugal force, a special actuator is not required. However, when the magnetic flux variable mechanism using a centrifugal force is provided in a rotor core, its design is complicated along with a change of a magnetic circuit for the rotor, and the rotor core is upsized.

In consideration of the circumstances, a rotary electric machine equipped with a magnetic flux variable mechanism and configured to change a magnetic flux directed from a permanent magnet to a stator coil without the use of a special actuator and without causing any influence such as changing of a magnetic circuit of a rotor core is demanded.

In view of this, one aspect of the present disclosure provides a rotary electric machine equipped with a magnetic flux variable mechanism, and the rotary electric machine includes a stator and a rotor. The stator is configured such that a stator coil is wound therearound. The rotor includes a rotor core in which a permanent magnet is embedded and is placed on an inner peripheral side from the stator via a predetermined gap. The magnetic flux variable mechanism is configured to change a magnetic flux directed to the stator coil from the permanent magnet of the rotor core according to a rotation speed of the rotor. The magnetic flux variable mechanism includes a case body, a mover, a magnetic flux short circuit member, a cam member, and biasing springs. The case body is fixed to an axial end surface of the rotor core at a position facing the permanent magnet. The mover is provided in the case body and the mover is configured to be restricted from moving in an axial direction and to move in a radial direction upon receipt of a centrifugal force corresponding to a rotation speed of the rotor. The magnetic flux short circuit member is provided in the case body and the magnetic flux short circuit member is configured to be restricted from moving in the radial direction and to move along the axial direction. The cam member is fixed to the magnetic flux short circuit member and the cam member includes a cam surface inclined at a predetermined inclination angle in a direction distanced from the axial end surface of the rotor core as the cam surface goes toward an outer peripheral side along the radial direction. The cam surface faces the mover and makes contact with the mover. The cam member is configured to convert a radial movement of the mover received by the cam surface into an axial movement of the magnetic flux short circuit member. The biasing springs are configured to give a biasing force to the magnetic flux short circuit member in the direction distanced from the axial end surface of the rotor core, and the biasing springs is configured to determine a position of the magnetic flux short circuit member along the axial direction in a state where the biasing force is balanced with the centrifugal force applied to the mover via the cam member.

In the configuration of the rotary electric machine, the magnetic flux variable mechanism includes the mover moved by a centrifugal force, the magnetic flux short circuit member, the cam member, and the biasing springs inside the case body fixed to the axial end surface of the rotor core. The cam member includes the cam surface inclined at the predetermined inclination angle so as to face the mover and make contact with the mover. The cam member is configured to convert the radial movement of the mover received by the cam surface into the axial movement of the magnetic flux short circuit member. The biasing springs give a biasing force to the magnetic flux short circuit member in the direction distanced from the axial end surface of the rotor core, so as to determine the position of the magnetic flux short circuit member along the axial direction in a state where the biasing force is balanced with the centrifugal force applied to the mover via the cam member. As such, the magnetic flux variable mechanism is placed so as to be fixed to the axial end surface on the outer side of the rotor core and moves the magnetic flux short circuit member by use of the centrifugal force applied to the mover. Accordingly, the rotary electric machine configured as such can change the magnetic flux directed from the permanent magnet to the stator coil without the use of a special actuator and without causing any influence such as changing of a magnetic circuit of the rotor core.

In the rotary electric machine, a clearance between the axial end surface of the rotor core and the magnetic flux short circuit member may be longer than a magnetic gap that is a gap between an inner peripheral surface of the stator around which the stator coil is wound and an outer peripheral surface of the rotor core. In the configuration of the rotary electric machine, most of the magnetic flux generated by the permanent magnet can be directed to the stator coil as an interlinkage magnetic flux in the stator coil.

Further, in the rotary electric machine, the magnetic flux variable mechanism may be incorporated into an end plate placed on the axial end surface of the rotor core. In the configuration of the rotary electric machine, the magnetic flux variable mechanism is incorporated in the end plate, so that the magnetic flux variable mechanism can also have a function of the end plate.

Further, in the rotary electric machine, the magnetic flux variable mechanism may be incorporated into one of two end plates placed on opposite axial end surfaces of the rotor core. In the configuration of the rotary electric machine, the magnetic flux variable mechanism is incorporated in either one of two end plates of the rotor, so that a reduction in a magnitude of the whole rotor including the end plate can be achieved in comparison with a case where the magnetic flux variable mechanisms are incorporated in the two end plates.

Further, in the rotary electric machine, the magnetic flux variable mechanism may include a thin plate fixed to the axial end surface of the rotor core inside the case body. Further, the thin plate may be a nonmagnetic material. Furthermore, a plate thickness of the thin plate may be shorter than a magnetic gap that is a gap between an inner peripheral surface of the stator and an outer peripheral surface of the rotor core. With the configuration of the rotary electric machine, when the plate thickness of the thin plate is set to be shorter than the magnetic gap that is a gap between the inner peripheral surface of the stator and an outer peripheral surface of the rotor core, and when the clearance between the end surface of the rotor core and the magnetic flux short circuit member is set to be larger than the magnetic gap appropriately, most of the magnetic flux generated by the permanent magnet can be directed to the stator coil as an interlinkage magnetic flux in the stator coil.

Further, in the rotary electric machine, the mover may include an inclined surface having the same inclination angle as the predetermined inclination angle of the cam member. With the configuration of the rotary electric machine, the radial movement of the mover can be converted into the axial movement of the magnetic flux short circuit member with a simple configuration using the inclined surfaces.

Furthermore, in the rotary electric machine, the mover may be a rolling ball and a spherical surface of the rolling ball is configured to make contact with the cam surface. In the configuration of the rotary electric machine, the conversion between the radial movement of the mover and the axial movement of the magnetic flux short circuit member is performed by a rolling contact, so that a contact resistance becomes smaller than that in a case where the moving direction is converted by a slide contact between the inclined surfaces. Hereby, the mover can move smoothly.

As described above, with the use of the rotary electric machine equipped with the magnetic flux variable mechanism, it is possible to change the magnetic flux directed from the permanent magnet to the stator coil without the use of a special actuator and without causing any influence such as changing of a magnetic circuit of the rotor core, and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes an embodiment in detail with reference to the drawings. The following description deals with a laminated body of magnetic thin plates as a rotor core. However, this is an exemplification for descriptions, and the rotor core may be an integrated rotor core, provided that the rotor core is a magnetic body in which a permanent magnet can be embedded. A shape, a material, and the like to be described below are exemplifications for descriptions and can be changed appropriately according to the specification and the like of a rotary electric machine equipped with a magnetic flux variable mechanism. Further, in the following description, similar elements in all drawings have the same reference sign and redundant descriptions thereof are omitted.

Figure 1:
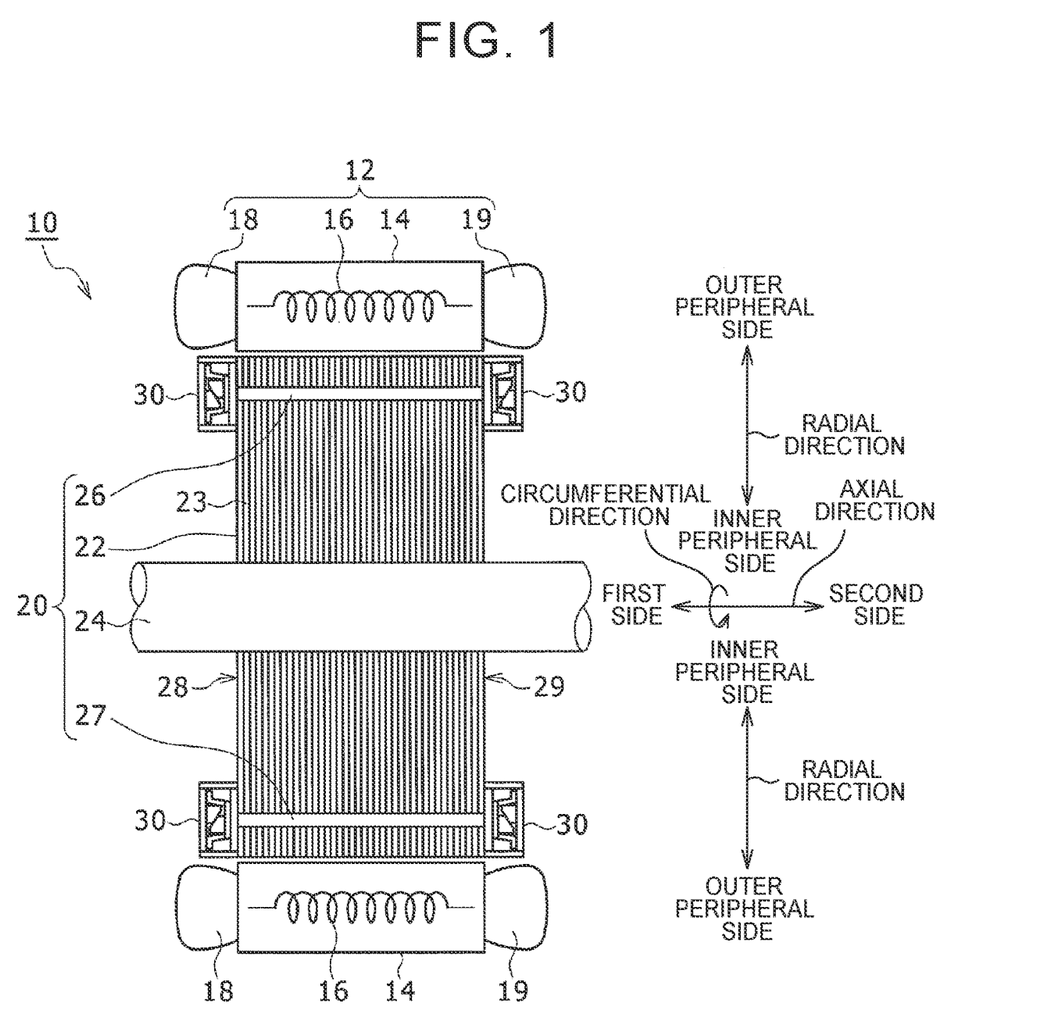
FIG. 1 is a sectional view of a rotary electric machine equipped with a magnetic flux variable mechanism according to an embodiment of the disclosure.

FIG. 1 is a sectional view of a rotary electric machine 10 equipped with a magnetic flux variable mechanism and provided in a vehicle, according to an embodiment of the disclosure. In the following description, the rotary electric machine 10 equipped with the magnetic flux variable mechanism will be referred to as the rotary electric machine 10 unless otherwise specified. The rotary electric machine 10 is a motor generator that functions as a motor when the vehicle performs power running and also functions as a generator at the time of braking of the vehicle. The rotary electric machine 10 is a three-phase synchronous rotary electric machine. The rotary electric machine 10 includes a stator 12, a rotor 20, and a magnetic flux variable mechanism 30.

The stator 12 is a stator of the rotary electric machine 10 and includes a stator core 14 and a stator coil 16 wound around the stator core 14. The stator core 14 is a magnetic component having a central hole where the rotor 20 is placed. Although not illustrated herein, the stator core 14 includes an annular back yoke, a plurality of teeth projecting toward the inner peripheral side from the back yoke, and a plurality of slots as spaces between adjacent teeth.

The stator coil 16 is constituted by distributed winding wires of three phases, and a winding wire of each phase is configured such that a conductor wire with insulation coating is passed through predetermined slots in the stator core 14 so as to be wound around a plurality of predetermined teeth. The winding wire of each phase is wound around the stator core 14, and parts thereof projecting from opposite end surfaces of the stator core 14 in its axial direction are referred to as coil ends 18, 19. A power line from the stator coil 16 is drawn out from the coil end 18 out of the coil ends 18, 19.

As a wire material of the conductor wire with insulation coating, a copper wire, a copper-tin alloy wire, a silver plating copper-tin alloy wire, and the like are used. As the insulation coating, an enamel coating film of polyamideimide is used. The distributed winding wires of three phases are an exemplification for descriptions of the stator coil 16, and depending on the specification of the rotary electric machine 10, the stator coil 16 may be constituted by concentrated winding wires.

The rotor 20 is a rotor of the rotary electric machine 10 and includes an annular rotor core 22 and a rotor shaft 24 fixed to a central hole of the rotor core 22. The rotor shaft 24 is an output shaft of the rotary electric machine 10.

The rotor core 22 is a laminated body in which a predetermined number of magnetic thin plates 23 is laminated in the axial direction. The reason why the rotor core 22 is constituted by the laminated body of the magnetic thin plates 23 is to restrain an eddy current to be caused in the rotor core 22. An insulating treatment such as insulation coating is performed on both surfaces of the magnetic thin plates 23 before they are molded into a predetermined shape. Hereby, the laminated magnetic thin plates 23 are electrically insulated from each other, so that an eddy current to be caused due to an outer variable magnetic field is divided into small loops and an eddy current loss is restrained.

The rotor core 22 is provided with a plurality of magnet insertion holes (not shown), and a permanent magnet is placed in each of the magnet insertion holes. The permanent magnet constitutes a magnetic pole of the rotor 20 and generates a magnetic flux toward the stator coil 16. The number of magnetic poles and the number of permanent magnets per magnetic pole are determined by the specification of the rotary electric machine 10. In FIG. 1, two permanent magnets 26, 27 that appear on the sectional view among a plurality of permanent magnets are illustrated. The permanent magnets 26, 27 are rectangular parallelepiped magnets having a rectangular sectional shape perpendicular to the axial direction and having an axial length slightly shorter than the axial length of the rotor core 22.

The permanent magnets 26, 27 are magnetized between the outer peripheral side and the inner peripheral side so that a magnetization direction is along the short-side direction of the rectangular sectional shape. For example, the permanent magnets 26, 27 are magnetized such that, when the polarity on the outer peripheral side is N, the polarity on the inner peripheral side is S (see FIGS. 2, 3). Note that magnetic poles adjacent along the circumferential direction have magnetization directions reverse to each other. That is, the permanent magnets constituting the magnetic poles are placed such that their polarities on the outer peripheral side facing the stator 12 side are changed alternately such as N, S, N, S, N, S, N, S along the circumferential direction. As the material of the permanent magnets 26, 27, a rare-earth magnet such as a neodymium magnet mainly containing neodymium, iron, and boron, and a samarium-cobalt magnet mainly containing samarium and cobalt is used. Alternatively, a ferrite magnet, an alnico magnet, and the like may be used.

The axial direction, the circumferential direction, and the radial direction are illustrated in FIG. 1. The axial direction is a direction parallel to the axial direction of the rotor shaft 24. In a case where the opposite directions along the axial direction are distinguished from each other, a direction of the coil end 18 where a power line is drawn is referred to as a first side, and a direction of the coil end 19 where a power line is not drawn is referred to as a second side. In a case where the opposite axial end surfaces of the rotor core 22 are distinguished from each other, an axial end surface on the first side is referred to as an end surface 28 and an axial end surface on the second side is referred to as an end surface 29 as illustrated in FIG. 1. The circumferential direction is a direction around the axial direction. The radial direction is a direction perpendicular to the axial direction and passing through the rotor shaft 24. In a case where the opposite directions along the radial direction are distinguished from each other, a direction directed to the rotor shaft 24 is referred to as an inner peripheral side and its opposite side is referred to as an outer peripheral side.

The magnetic flux variable mechanism 30 is a mechanism configured to change a magnetic flux directed to the stator coil 16 of the stator 12 from the permanent magnet 26, 27 of the rotor core 22 according to a rotation speed of the rotor 20. When the rotor 20 rotates at a low rotation speed, the magnetic flux variable mechanism 30 causes most of the magnetic flux generated in the permanent magnet 26, 27 to be directed to the stator coil 16. When the rotor 20 rotates at a high rotation speed, the magnetic flux variable mechanism 30 short-circuits the magnetic flux generated in the permanent magnet 26, 27 so as to reduce the magnetic flux directed to the stator coil 16. This prevents a counterelectromotive voltage caused by the magnetic flux interlinked with the stator coil 16 from being excessive when the rotor 20 rotates at a high rotation speed.

FIG. 1 illustrates four magnetic flux variable mechanisms 30 in total provided on the end surfaces 28, 29 of the rotor core 22 in the axial direction so as to correspond to respective ends of two permanent magnets 26, 27. In a case where the rotor core 22 is provided with N pieces of permanent magnets, 2N pieces of magnetic flux variable mechanisms 30 are provided. This is an exemplification for descriptions, and the magnetic flux variable mechanisms 30 may be provided on only one axial end surface of the rotor core 22 so as to correspond to respective permanent magnets. One example will be described in terms of FIG. 1. In this example, one magnetic flux variable mechanism 30 may be provided for each of two permanent magnets 26, 27, only on the end surface 28, on the first side, of the rotor core 22. That is, two magnetic flux variable mechanisms 30 in total may be provided. Alternatively, one magnetic flux variable mechanism 30 may be provided for each of the two permanent magnets 26, 27, only on the end surface 29, on the second side, of the rotor core 22. That is, two magnetic flux variable mechanisms 30 in total may be provided. In a case where the rotor core 22 is provided with N pieces of permanent magnets, N pieces of magnetic flux variable mechanisms 30 are just provided. Further, if a smooth operation of the rotary electric machine 10 can be secured, the magnetic flux variable mechanisms 30 may be provided not for all the permanent magnets, but for half of the permanent magnets, e.g., the magnetic flux variable mechanisms 30 may be provided for every other one of the permanent magnets along the circumferential direction. In some cases, the magnetic flux variable mechanisms 30 may be provided for a further smaller number of the permanent magnets than the half of the permanent magnets so as to skip n pieces (more than one) of the permanent magnets.

Figure 2:
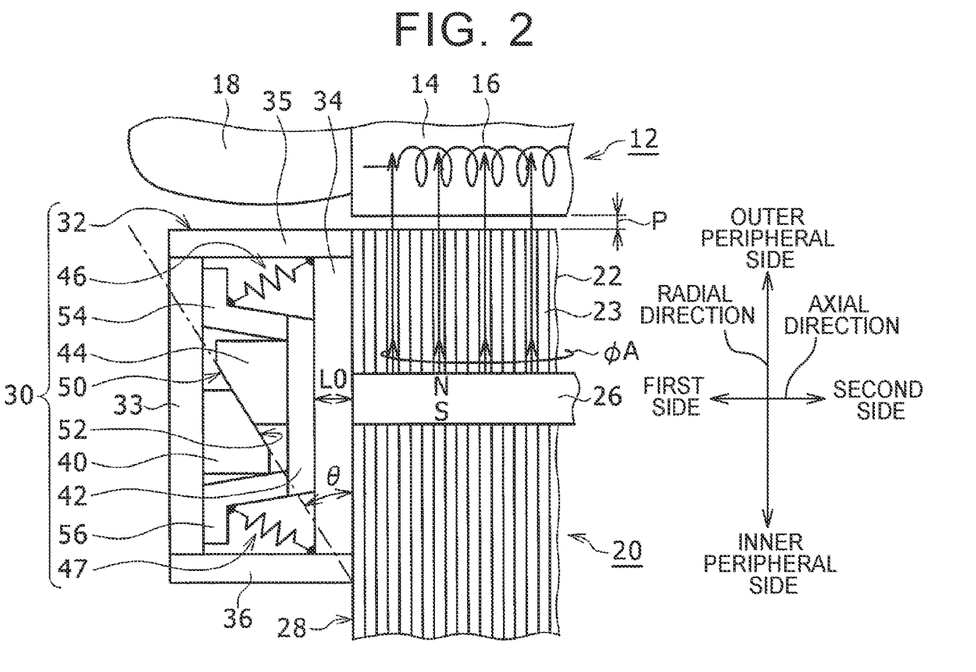
FIG. 2 is a sectional view of the magnetic flux variable mechanism in FIG. 1.

FIG. 2 is a sectional view illustrating a configuration of the magnetic flux variable mechanism 30 provided for the permanent magnet 26, on the end surface 28 of the rotor core 22 on the first side. FIG. 2 illustrates a case where the rotor 20 is stopped or rotates at a low rotation speed and most of a magnetic flux φA generated by the permanent magnet 26 is directed to the stator coil 16 of the stator 12 so as to form an interlinkage magnetic flux in the stator coil 16. Note that FIG. 2 and the following drawings deal with a case where the polarity of the permanent magnet 26 on the outer peripheral side is N and the polarity thereof on the inner peripheral side is S.

The magnetic flux variable mechanism 30 includes a case body 32, a mover 40, a magnetic flux short circuit member 42, a cam member 44, and biasing springs 46, 47.

The case body 32 is a housing fixed to the end surface 28, on the first side, of the rotor core 22 and is constituted by wall members 33, 34, 35, 36. The wall members 33, 34 are wall members parallel to the radial direction. The wall member 33 is placed on the first side in the axial direction, and the wall member 34 is placed on the second side in the axial direction. An axial movement of an element inside the case body 32 is restricted by the wall members 33, 34. Note that a part of the wall member 34 that faces a first-side end surface of the permanent magnet 26 is provided with a suitable opening so that the magnetic flux short circuit member 42 can move along the axial direction. The wall members 35, 36 are wall members parallel to the axial direction. The wall member 35 is placed on the outer peripheral side along the radial direction, and the wall member 36 is placed on the inner peripheral side along the radial direction. A radial movement of the element inside the case body 32 is restricted by the wall members 35, 36. The case body 32 is made of a nonmagnetic material.

As the means for fixing the case body 32 to the end surface 28 of the rotor core 22, a bonding device configured to bond the wall member 34 to the end surface 28, on the first side, of the rotor core 22 is used. Instead of the bonding device, a caulking device may be used such that a connection member (not shown) is extended from the case body 32 toward the rotor shaft 24 side and the connection member is connected and fixed to the rotor shaft 24 by the caulking device. Instead of the caulking device, a screw fastening device may be used. In some cases, welding to fix the case body 32 to an outer peripheral surface of the rotor core 22 may be used.

The mover 40 is a wedge-shaped member including a flat surface on the first side, an axial movement of which is restricted by the wall member 33 of the case body 32, and an inclined surface 52 as an inclined surface of the second side, the inclined surface 52 facing a cam surface 50 of the cam member 44 so as to make contact therewith. The mover 40 is movable in the radial direction such that the inclined surface 52 slides over the cam surface 50. The mover 40 is made of a nonmagnetic material.

The magnetic flux short circuit member 42 is a magnetic plate member placed so as to face the first-side end surface of the permanent magnet 26 via the opening provided in the wall member 34 of the case body 32 and to extend with a predetermined length in the radial direction. The predetermined length is set to be longer than the length of the permanent magnet 26 along the radial direction.

The cam member 44 is a wedge-shaped member including a second-side flat surface fixed to a first-side flat surface of the magnetic flux short circuit member 42 as a plate member, and the cam surface 50 as a first-side inclined surface facing the inclined surface 52 of the mover 40 so as to make contact therewith. The cam member 44 has a sectional shape symmetric to the sectional shape of the mover 40 in the axial direction and the radial direction. In other words, two wedge-shaped members having the same sectional shape are used as follows: a first one of them is provided as the cam member 44 such that the flat surface on the opposite side from the inclined surface is fixed to the first-side flat surface of the magnetic flux short circuit member 42; and a second one of them is provided as the mover 40 such that the flat surface on the opposite side from the inclined surface is placed so as to abut with the wall member 33 of the case body 32. The cam surface 50 is an inclined surface that is inclined at a predetermined inclination angle θ in a direction distanced from the end surface 28 of the rotor core 22 as it goes toward the outer peripheral side along the radial direction. The inclined surface 52 of the mover 40 has the same inclination angle as the predetermined inclination angle θ of the cam surface 50. With this relationship, the mover 40 can slide along the cam surface 50 in the radial direction.

The cam surface 50 of the cam member 44 makes surface contact with the inclined surface 52 of the mover 40, so that an axial movement of the magnetic flux short circuit member 42 can be converted into a radial movement of the mover 40 and vice versa. For example, the radial movement due to a centrifugal force that the mover 40 receives is converted into the axial movement of the magnetic flux short circuit member 42 between the inclined surface 52 and the cam surface 50. As such, when the cam surface 50 of the cam member 44 makes contact with the inclined surface 52, it is possible to make a conversion between the radial movement and the axial movement by a simple configuration using the inclined surfaces. The cam member 44 is made of a nonmagnetic material.

Leg portions 54, 56 are nonmagnetic members fixed to the opposite radial ends of the magnetic flux short circuit member 42 in an integrated manner so as to stand toward the first side in the axial direction. The leg portions 54, 56 are provided so as to stand slightly diagonally from the opposite radial ends of the magnetic flux short circuit member 42 and to abut with the wall member 33 of the case body 32, and include overhanging portions further extending in the radial direction from parts abutting with the wall member 33. An end of the overhanging portion in the leg portion 54 faces the wall member 35 of the case body 32 so as to restrict a radial movement toward the outer peripheral side. Similarly, an end of the overhanging portion in the leg portion 56 faces the wall member 36 of the case body 32 so as to restrict a radial movement toward the inner peripheral side. Since the leg portions 54, 56 are integrated with the magnetic flux short circuit member 42, the magnetic flux short circuit member 42 can move along the axial direction, but its movement along the radial direction is restricted.

The biasing springs 46, 47 are elastic members giving a biasing force to the magnetic flux short circuit member 42 in a direction distanced from the end surface 28 of the rotor core 22. A first end of the biasing spring 46 is fixed to the wall member 35 of the case body 32, and a second end thereof is fixed to the overhanging portion of the leg portion 54. Similarly, a first end of the biasing spring 47 is fixed to the wall member 36 of the case body 32, and a second end thereof is fixed to the overhanging portion of the leg portion 56.

Figure 3:
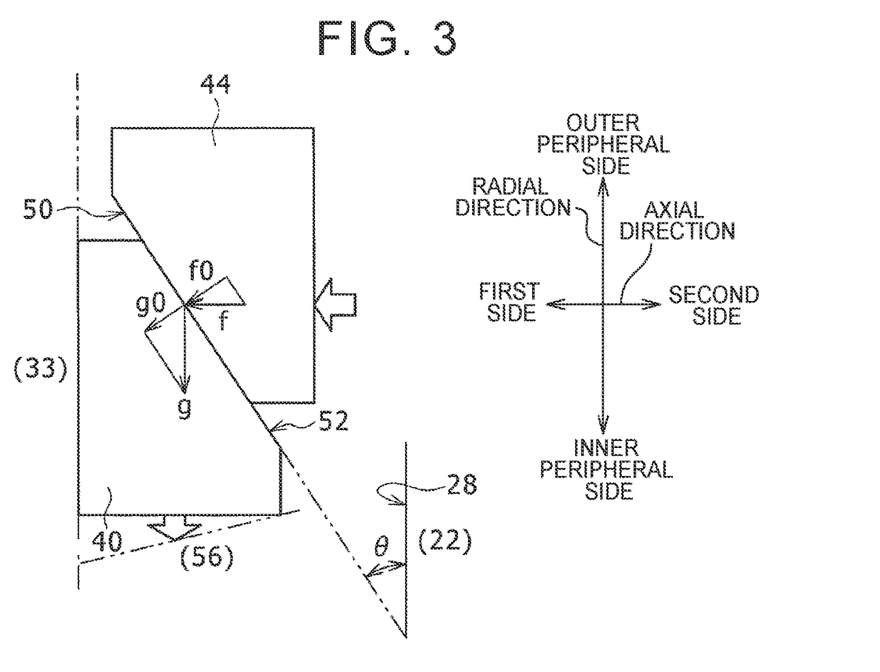
FIG. 3 is a view illustrating conversion of a moving direction between a mover and a cam member and a force relationship between a cam surface of the cam member and an inclined surface of the mover in FIG. 2.

FIG. 3 is a view related to FIG. 2 and illustrates conversion in a moving direction between the mover 40 and the cam member 44 based on the biasing force that the biasing springs 46, 47 give to the cam member 44 via the magnetic flux short circuit member 42, and a force relationship between the cam surface 50 and the inclined surface 52. In FIG. 2, a centrifugal force applied to the mover 40 is ignored because the rotor 20 is stopped or rotates at a low rotation speed. The cam member 44 receives a biasing force f directed toward the first side in the axial direction from the biasing springs 46, 47 via the magnetic flux short circuit member 42. The biasing force f is divided on the cam surface 50 into a drag component f0 perpendicular to the cam surface 50 and a force component parallel to the cam surface 50. The inclined surface 52 making contact with the cam surface 50 receives a drag component g0 having the same magnitude as f0. The drag component g0 is converted into a force g parallel to the radial direction. Since the direction of the force g is a direction directed toward the inner peripheral side in the radial direction, the mover 40 is moved by the force g toward the inner peripheral side in the radial direction, so that a radial movement thereof is stopped by the leg portion 56. In response to the movement of the mover 40, the cam member 44 moves toward the first side in the axial direction, and the magnetic flux short circuit member 42 integrated with the cam member 44 is distanced from the end surface 28 of the rotor core 22.

With reference to FIG. 2, a clearance between the end surface 28 of the rotor core 22 and the magnetic flux short circuit member 42 is indicated by L0. The clearance L0 is set to be larger than a magnetic gap P that is a gap between an inner peripheral surface of the stator core 14 and an outer peripheral surface of the rotor core 22. Accordingly, most of a magnetic flux φA generated by the permanent magnet 26 is directed to the stator coil 16 of the stator 12 so as to form an interlinkage magnetic flux in the stator coil 16.

Figure 4:
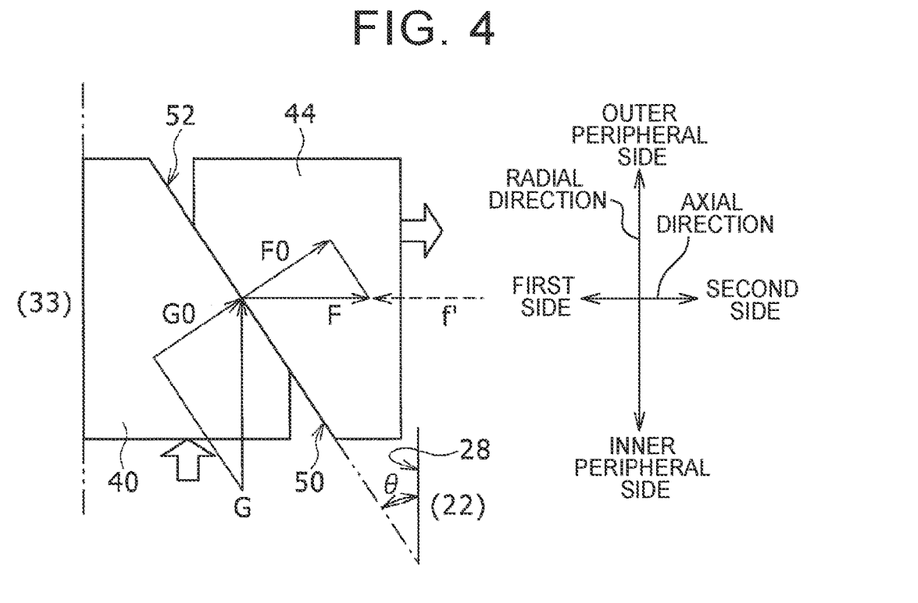
FIG. 4 is a view illustrating conversion of the moving direction between the mover and the cam member and a force relationship between the inclined surface of the mover and the cam surface of the cam member in a case where a rotor rotates at a high rotation speed.

FIG. 4 is a view illustrating, in a case where the rotor 20 rotates at a high rotation speed, conversion in a moving direction between the radial movement of the mover 40 and the axial movement of the cam member 44 based on the centrifugal force that the mover 40 receives, and a force relationship between the inclined surface 52 and the cam surface 50. Herein, the centrifugal force that the mover 40 receives is balanced with the biasing force that the magnetic flux short circuit member 42 receives from the biasing springs 46, 47, via the cam member 44. When the rotor 20 rotates at a high rotation speed, the mover 40 receives a centrifugal force G directed toward the outer peripheral side in the radial direction. Hereby, the mover 40 moves toward the outer peripheral side in the radial direction. The centrifugal force G is divided on the inclined surface 52 into a drag component G0 perpendicular to the inclined surface 52 and a force component parallel to the inclined surface 52. The cam surface 50 making contact with the inclined surface 52 receives a drag component F0 having the same magnitude as G0. The drag component F0 is converted into a pressing force F parallel to the axial direction. The cam member 44 is moved by the pressing force F toward the second side in the axial direction, and the magnetic flux short circuit member 42 integrated with the cam member 44 comes closer to the end surface 28 of the rotor core 22. Along with the movement of the cam member 44 along the axial direction, the biasing springs 46, 47 are compressed, so that a biasing force f' is increased to be larger than the biasing force f in a state where the rotor 20 is stopped as described in FIG. 3. In a state where the biasing force f' thus increased is balanced with the pressing force F converted from the centrifugal force G, a position of the cam member 44 along the axial direction is determined. As such, the biasing springs 46, 47 give a biasing force to the magnetic flux short circuit member 42 in a direction distanced from the end surface 28 of the rotor core 22, and determines a position of the magnetic flux short circuit member 42 along the axial direction in a state where the biasing force is balanced with the pressing force F.

Figure 5:
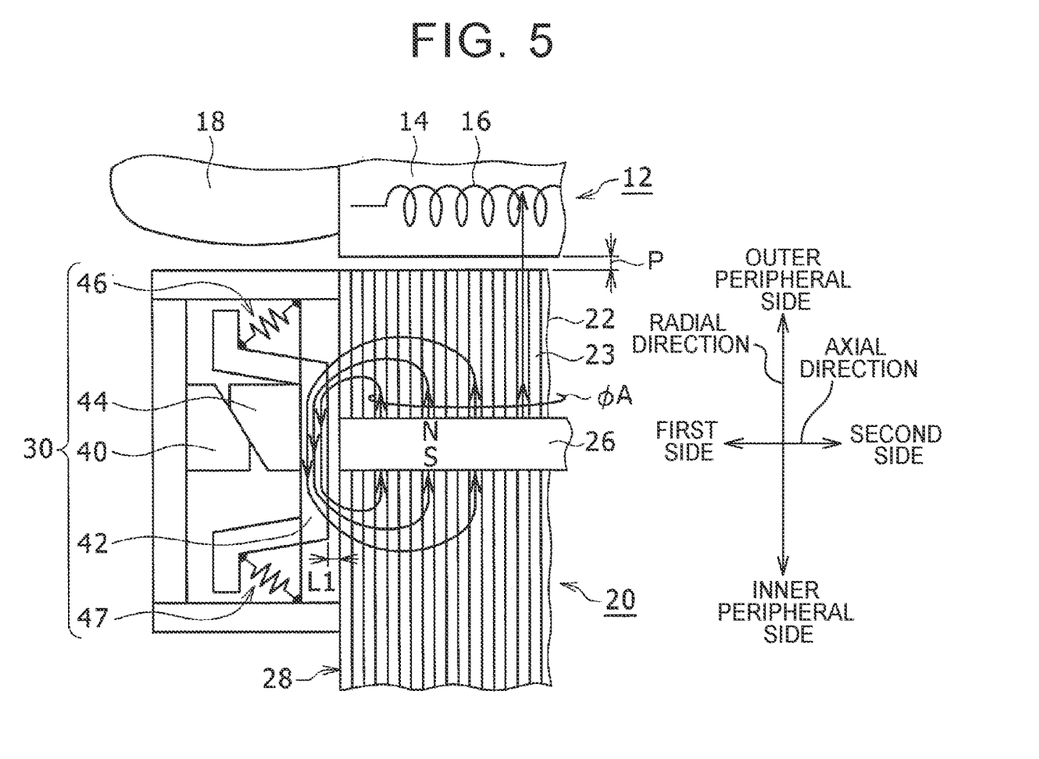
FIG. 5 is a sectional view illustrating a case where the rotor rotates at a high rotation speed in FIG. 2.

FIG. 5 is a sectional view of the magnetic flux variable mechanism 30 in the state of FIG. 4. That is, FIG. 5 is a view illustrating a case where the rotor 20 rotates at a high rotation speed. As illustrated in FIG. 4, the mover 40 receives a centrifugal force, and in comparison with the state of FIG. 2, the mover 40 moves toward the outer peripheral side in the radial direction while its axial movement is restricted. Along with this, the cam member 44 moves toward the second side in the axial direction and the magnetic flux short circuit member 42 comes very close to the end surface 28 of the rotor core 22. A clearance between the end surface 28 of the rotor core 22 and the magnetic flux short circuit member 42 is indicated by L1. The clearance L1 is set to be smaller than the clearance L0 in FIG. 2 and is also smaller than the magnetic gap P. Accordingly, a part of the magnetic flux ϕA generated by the permanent magnet 26 is directed to the magnetic flux short circuit member 42 of the magnetic flux variable mechanism 30, so that a magnetic flux directed to the stator coil 16 of the stator 12 is smaller than the whole magnetic flux ϕA. Hereby, it is possible to prevent a counterelectromotive voltage caused by the magnetic flux interlinked with the stator coil 16 from being excessive when the rotor 20 rotates at a high rotation speed. The clearance L1 is set by experiment, simulation, and the like based on the specification such as a drive voltage of the rotary electric machine 10, a maximum rotation speed, and magnetic fluxes generated by the permanent magnets 26, 27, in consideration of the relationship between the rotation speed of the rotor 20 and the counterelectromotive voltage in the stator coil 16.

In the above description, the magnetic flux variable mechanism 30 is fixed and attached to the end surface 28 of the rotor core 22 in the axial direction. Among the wall members constituting the case body 32 of the magnetic flux variable mechanism 30, the wall member 34 that faces the permanent magnet 26 has an opening so that the magnetic flux short circuit member 42 can move in the axial direction. Instead of this, a nonmagnetic thin plate (see FIG. 7) having a suitable thickness t0 may be fitted to the opening provided in the wall member 34. Hereby, in a case where the rotor 20 rotates at a high rotation speed, it is possible to effectively prevent the permanent magnet 26 from protruding from the magnet insertion hole.

Figure 6:
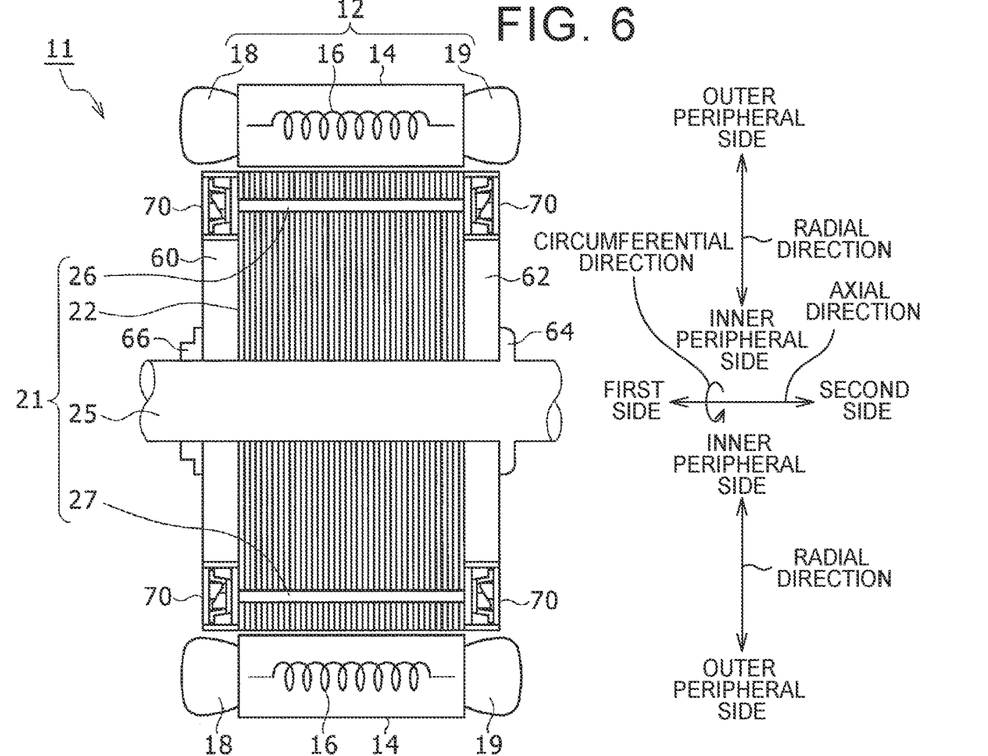
FIG. 6 is a sectional view of a rotary electric machine equipped with a magnetic flux variable mechanism as a first modification of the embodiment, the rotary electric machine including an end plate in which the magnetic flux variable mechanism is incorporated.

Further, as a first modification of the embodiment of the disclosure, a magnetic flux variable mechanism can be incorporated in an end plate. FIG. 6 illustrates a configuration of a rotary electric machine 11 including end plates 60, 62 into which magnetic flux variable mechanisms 70 are incorporated as the first modification. The end plates 60, 62 into which the magnetic flux variable mechanisms 70 are incorporated have a function to prevent protrusion of the permanent magnets in the axial direction and to prevent breakage of lamination of the magnetic thin plates 23 in the rotor core 22, similarly to a general end plate.

The end plates 60, 62 are disciform members placed on the opposite end surfaces of the rotor core 22 in the axial direction and the magnetic flux variable mechanisms 70 are incorporated in respective outer peripheral sides of the end plates 60, 62. The end plates 60, 62 are fixed to the rotor core 22 in an integrated manner by an appropriate joining apparatus. As the appropriate joining apparatus, an adhesive material, welding, caulking, locking and fixing by a detent portion, and the like are used. At the time of integration, the central hole of the annular rotor core 22 is aligned with the central holes of the disciform end plates 60, 62, so as to form a central hole penetrating through an integrated rotor 21, and a rotor shaft 25 as an output shaft of the rotary electric machine 11 is fixed to the central hole. A rib portion 64 that receives a second side, in the axial direction, of the rotor 21 integrated with the end plates 60, 62 is provided in a second side of the rotor shaft 25. A fastening device 66 for fastening and fixing a first side, in the axial direction, of the integrated rotor 21 to the rotor shaft 25 is provided in a first side of the rotor shaft 25. As the fastening device 66, a male screw is provided in the rotor shaft 25, and a nut meshing with the male screw can be used.

The end plates 60, 62 are made of a nonmagnetic material. As a material for the nonmagnetic material, nonmagnetic stainless steel (SUS) is used. Instead of this, a nonmagnetic metallic material such as aluminum and copper or a resin material having a suitable strength can be used. The plate thickness of an outer peripheral side of the end plates 60, 62 has a thickness necessary to incorporate the magnetic flux variable mechanisms 70 therein, but it is preferable that other parts of the end plates 60, 62 be made thin within a range that secures a suitable strength, so as to achieve a reduction in weight. In FIG. 6, the magnetic flux variable mechanisms 70 are incorporated in both of the end plates 60, 62. In a case where the thickness, in the axial direction, of the magnetic flux variable mechanisms 70 is larger than the plate thickness of a general end plate, the magnetic flux variable mechanisms 70 may be incorporated in either one of two end plates 60, 62, and the other one of the two end plates may be a general end plate. Hereby, the rotor 21 and the rotary electric machine 11 are reduced in axial dimension, thereby achieving downsizing.

Figure 7:
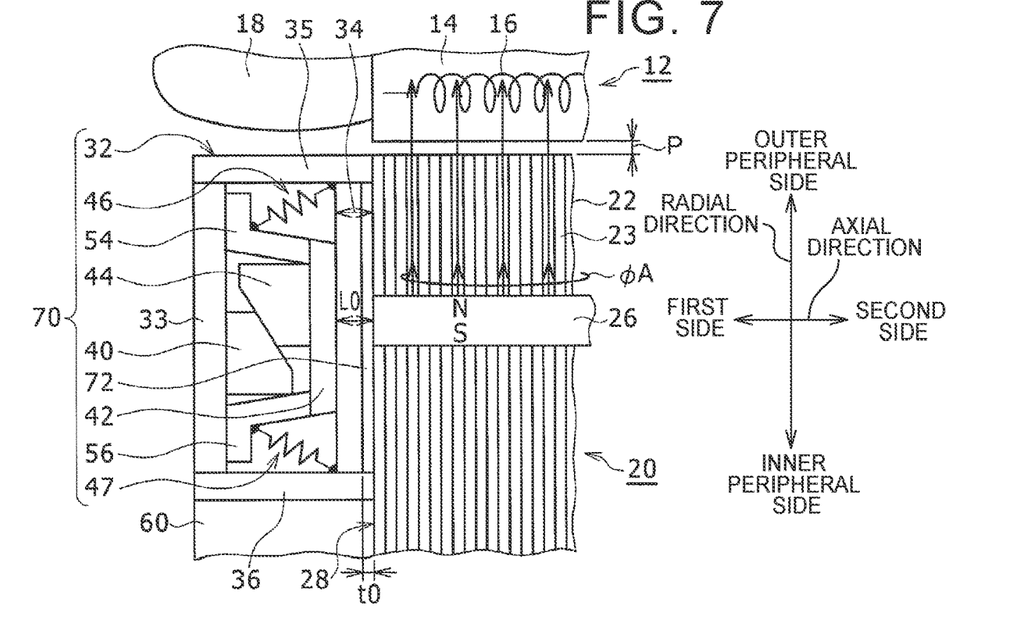
FIG. 7 is a sectional view of the magnetic flux variable mechanism in FIG. 6.

FIG. 7 corresponds to FIG. 2 and is a sectional view of the magnetic flux variable mechanism 70 when the rotor 21 is stopped or rotates at a low rotation speed. The magnetic flux variable mechanism 70 is incorporated in the outer peripheral side, in the radial direction, of the end plate 60. A difference between the magnetic flux variable mechanism 70 and the magnetic flux variable mechanism 30 in FIG. 2 is that a nonmagnetic thin plate 72 is fitted to the opening formed in the wall member 34 of the case body 32 so that the magnetic flux short circuit member 42 can move in the axial direction. The thin plate 72 is fixed to the end surface 28 of the rotor core 22. A plate thickness t0 of the thin plate 72 is set to a dimension that is not more than L1 described in FIG. 5 and has a suitable strength. A magnitude relationship among t0, L1, and the magnetic gap P is t0≤L1<P. The other configuration is similar to the above configuration described in FIG. 2. Accordingly, the clearance L0 between the end surface 28 of the rotor core 22 and the magnetic flux short circuit member 42 is larger than the magnetic gap P, and hereby, most of the magnetic flux ϕA generated by the permanent magnet 26 is directed to the stator 12 so as to form an interlinkage magnetic flux in the stator coil 16.

Figure 8:
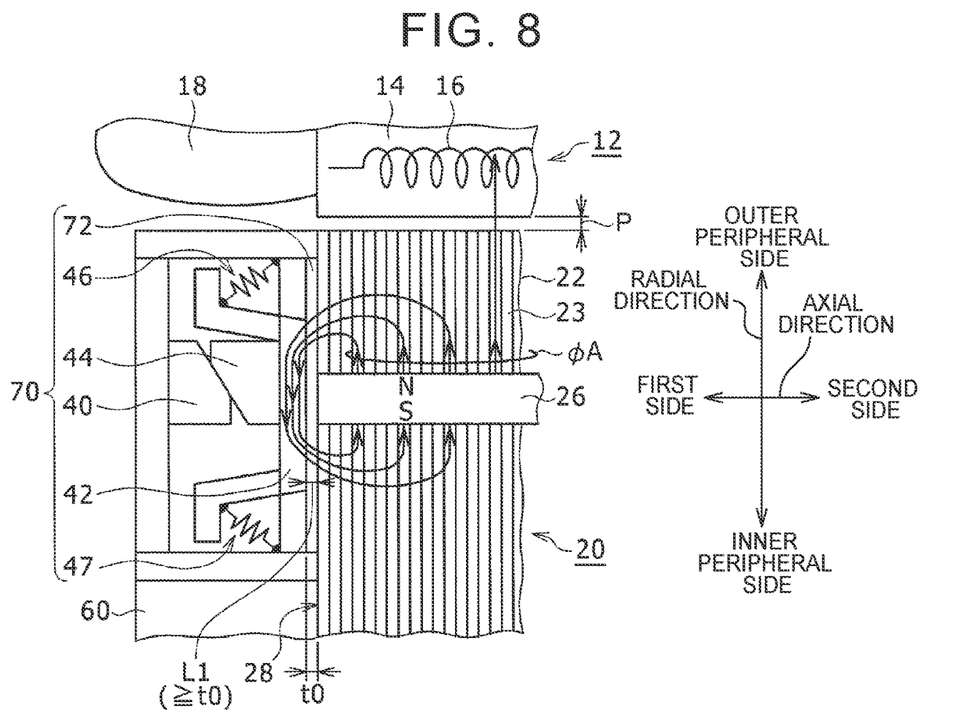
FIG. 8 is a sectional view illustrating a case where a rotor rotates at a high rotation speed in FIG. 6.

FIG. 8 corresponds to FIG. 5 and is a sectional view of the magnetic flux variable mechanism 70 when the rotor 21 rotates at a high rotation speed. A difference between the magnetic flux variable mechanism 70 and the magnetic flux variable mechanism 30 in FIG. 5 is that the thin plate 72 having a plate thickness t0 as described in FIG. 7 is provided. As has been described earlier in FIG. 5, when the rotor 21 rotates at a high rotation speed, the mover 40 receives a centrifugal force and moves toward the outer peripheral side in the radial direction, so that the cam member 44 moves toward the second side in the axial direction and the magnetic flux short circuit member 42 comes very close to the end surface 28 of the rotor core 22. The clearance L1 between the end surface 28 of the rotor core 22 and the magnetic flux short circuit member 42 is set to be smaller than the magnetic gap P. Here, the thin plate 72 is provided between the end surface 28 of the rotor core 22 and the magnetic flux short circuit member 42. However, the plate thickness t0 of the thin plate 72 is set to be not more than L1, so that the distance between the end surface 28 of the rotor core 22 and the magnetic flux short circuit member 42 does not become larger than L1. Accordingly, a part of the magnetic flux φA generated by the permanent magnet 26 is directed to the magnetic flux short circuit member 42 of the magnetic flux variable mechanism 70, so that a magnetic flux directed to the stator coil 16 of the stator 12 is smaller than the whole magnetic flux φA. Hereby, it is possible to prevent a counterelectromotive voltage caused by the magnetic flux interlinked with the stator coil 16 from being excessive when the rotor 21 rotates at a high rotation speed.

Figure 9:
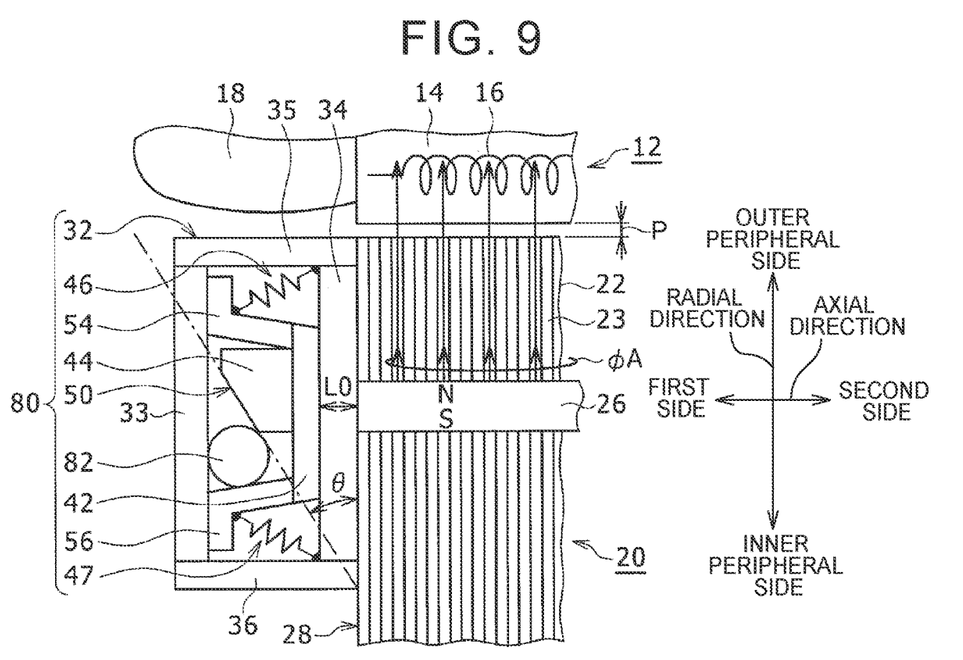
FIG. 9 is a view illustrating a magnetic flux variable mechanism of a rotary electric machine equipped with the magnetic flux variable mechanism as a second modification of the embodiment.

In the magnetic flux variable mechanism 30, the wedge-shaped member including the inclined surface 52 slidable over the cam surface 50 of the cam member 44 is used as the mover 40. The mover may have a shape other than the wedge shape, provided that the conversion between the axial movement of the magnetic flux short circuit member 42 and the radial movement of the mover 40 can be performed by use of the cam surface 50 of the cam member 44. In view of this, in terms of a rotary electric machine as a second modification of the embodiment of the disclosure, a magnetic flux variable mechanism 80 that uses a rolling ball 82 as a mover is illustrated in FIG. 9. The rolling ball 82 is movable in the radial direction such that its spherical surface makes contact with the cam surface 50 of the cam member 44. Except that the mover is the rolling ball 82, the configuration is the same as the magnetic flux variable mechanism 30 described in FIG. 2.

Similarly to FIG. 2, FIG. 9 is a view illustrating a case where the rotor 20 is stopped or rotates at a low rotation speed. Herein, a centrifugal force in the radial direction is not applied to the rolling ball 82 as a mover and the cam member 44 moves toward the first side in the axial direction by the action of the biasing springs 46, 47. A clearance between the end surface 28 of the rotor core 22 and the magnetic flux short circuit member 42 is the clearance L0 described in FIG. 2. The clearance L0 is set to be larger than the magnetic gap P between the inner peripheral surface of the stator core 14 and the outer peripheral surface of the rotor core 22. Accordingly, most of the magnetic flux φA generated by the permanent magnet 26 is directed to the stator coil 16 of the stator 12 so as to form an interlinkage magnetic flux in the stator coil 16.

Figure 10:
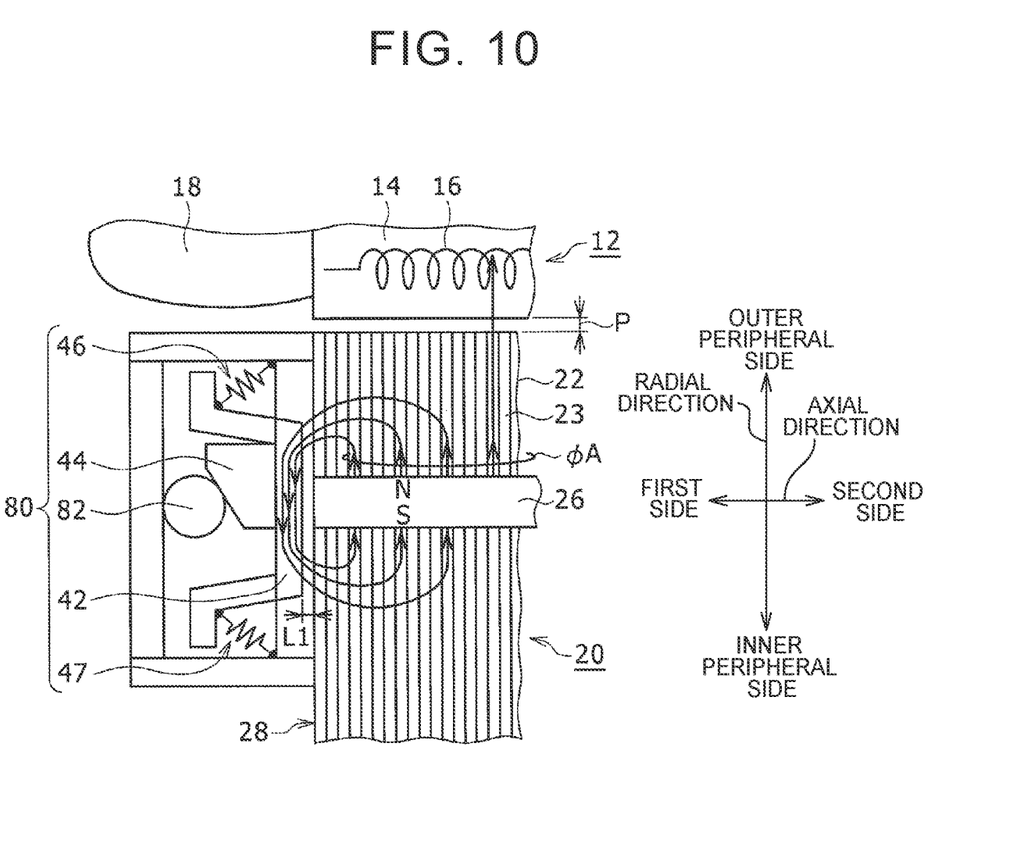
FIG. 10 is a sectional view illustrating a case where a rotor rotates at a high rotation speed in FIG. 9.

FIG. 10 corresponds to FIG. 5 and illustrates a case where the rotor 20 rotates at a high rotation speed. Similarly to what is described in FIG. 5, when the rotor 20 rotates at a high rotation speed, the rolling ball 82 as a mover receives a centrifugal force and moves toward the outer peripheral side in the radial direction, the cam member 44 moves toward the second side in the axial direction, and the magnetic flux short circuit member 42 comes very close to the end surface 28 of the rotor core 22. The clearance L1 between the end surface 28 of the rotor core 22 and the magnetic flux short circuit member 42 is set to be smaller than the magnetic gap P. Accordingly, a part of the magnetic flux φA generated by the permanent magnet 26 is directed to the magnetic flux short circuit member 42 of the magnetic flux variable mechanism 70, so that a magnetic flux directed to the stator coil 16 of the stator 12 is smaller than the whole magnetic flux φA. Hereby, it is possible to prevent a counterelectromotive voltage caused by the magnetic flux interlinked with the stator coil 16 from being excessive when the rotor 20 rotates at a high rotation speed.

The magnetic flux variable mechanism 80 using the rolling ball 82 as a mover yields the same effect as the magnetic flux variable mechanism 30 in FIG. 2 or the magnetic flux variable mechanism 70 in FIG. 7. Here, since the rolling ball 82 is used as a mover, the conversion between the radial movement and the axial movement is performed by a rolling contact. In a case where the mover 40 as the wedge-shaped member as illustrated in FIGS. 2, 7 is used, the conversion between the radial movement and the axial movement is performed by a slide contact between the inclined surfaces. Accordingly, a contact resistance is smaller in the case where the rolling ball 82 is used than in the case where the mover 40 as the wedge-shaped member is used, so that the mover can move smoothly.

In the rotary electric machine 10, 11 equipped with the magnetic flux variable mechanism and configured as described above, the magnetic flux variable mechanism 30, 70, 80 includes the mover moved by a centrifugal force, the magnetic flux short circuit member 42, the cam member 44, and the biasing springs 46, 47, inside the case body 32 fixed to the axial end surface of the rotor core 22. The cam member 44 includes the cam surface 50 inclined at the predetermined inclination angle θ so as to face the mover and make contact with the mover, and the cam member 44 is configured to convert the radial movement of the mover 40 received by the cam surface 50 into the axial movement of the magnetic flux short circuit member 42. The biasing springs 46, 47 give a biasing force to the magnetic flux short circuit member 42 in the direction distanced from the end surface 28 of the rotor core 22 in the axial direction, and determines the position of the magnetic flux short circuit member 42 along the axial direction in a state where the biasing force is balanced with the centrifugal force applied to the mover 40 via the cam member 44. As such, the magnetic flux variable mechanism 30, 70, 80 is placed so as to be fixed to the axial end surface of the rotor core 22 as its outer side and moves the magnetic flux short circuit member 42 by use of the centrifugal force applied to the mover. Accordingly, the rotary electric machine 10, 11 configured as such can change the magnetic flux directed from the permanent magnet to the stator coil 16 without the use of a special actuator and without causing any influence such as changing of a magnetic circuit of the rotor core 22.

What is claimed is:

1. A rotary electric machine comprising:
   a stator around which a stator coil is wound;
   a rotor including a rotor core in which a permanent magnet is embedded, the rotor being placed on an inner peripheral side from the stator via a predetermined gap; and
   a magnetic flux variable mechanism configured to change a magnetic flux directed to the stator coil from the permanent magnet of the rotor core according to a rotation speed of the rotor, the magnetic flux variable mechanism including:
     a case body fixed to an axial end surface of the rotor core at a position facing the permanent magnet without the centrifugal force applied to the mover via the cam member;
     a mover provided in the case body, the mover being configured to be restricted from moving in an axial direction and to move in a radial direction upon receipt of a centrifugal force corresponding to a rotation speed of the rotor;
     a magnetic flux short circuit member provided in the case body, the magnetic flux short circuit member being configured to be restricted from moving in the radial direction and to move along the axial direction;
     a cam member fixed to the magnetic flux short circuit member, the cam member including a cam surface inclined at a predetermined inclination angle in a direction distanced from the axial end surface of the rotor core as the cam surface goes toward an outer peripheral side along the radial direction, the cam surface facing the mover and making contact with the mover, and the cam member being configured to convert a radial movement of the mover received by the cam surface into an axial movement of the magnetic flux short circuit member; and biasing springs configured to give a biasing force to the magnetic flux short circuit member in the direction distanced from the axial end surface of the rotor core, the biasing springs being configured to determine a position of the magnetic flux short circuit member along the axial direction in a state where the biasing force is balanced with the centrifugal force applied to the mover via the cam member.

2. The rotary electric machine according to claim 1, wherein a clearance between the axial end surface of the rotor core and the magnetic flux short circuit member is longer than a magnetic gap that is a gap between an inner peripheral surface of the stator around which the stator coil is wound and an outer peripheral surface of the rotor core.

3. The rotary electric machine according to claim 1, wherein the magnetic flux variable mechanism is incorporated into an end plate placed on the axial end surface of the rotor core.

4. The rotary electric machine according to claim 3, wherein the magnetic flux variable mechanism is incorporated into one of two end plates placed on opposite axial end surfaces of the rotor core.

5. The rotary electric machine according to claim 3, wherein the magnetic flux variable mechanism includes a thin plate fixed to the axial end surface of the rotor core inside the case body.

6. The rotary electric machine according to claim 5, wherein the thin plate is a nonmagnetic material.

7. The rotary electric machine according to claim 5, wherein a plate thickness of the thin plate is shorter than a magnetic gap that is a gap between an inner peripheral surface of the stator and an outer peripheral surface of the rotor core.

8. The rotary electric machine according to claim 1, wherein the mover includes an inclined surface having the same inclination angle as the predetermined inclination angle of the cam member.

9. The rotary electric machine according to claim 1, wherein the mover is a rolling ball and a spherical surface of the rolling ball is configured to make contact with the cam surface.

* * * * *